US012688237B2

(12) United States Patent
Shi et al.

(10) Patent No.: US 12,688,237 B2
(45) Date of Patent: Jul. 21, 2026

(54) LISTWISE AUTOCOMPLETE RANKING WITH POSITION DEBIAS

(71) Applicant: eBay Inc., San Jose, CA (US)

(72) Inventors: Peng Shi, Shanghai (CN); Canran Xu, Shanghai (CN); Xi Chen, Shanghai (CN)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 18/983,062

(22) Filed: Dec. 16, 2024

(65) Prior Publication Data

US 2026/0170060 A1 Jun. 18, 2026

(51) Int. Cl.
*G06F 16/9032* (2019.01)
*G06F 16/2457* (2019.01)
*G06N 3/04* (2023.01)

(52) U.S. Cl.
CPC .. *G06F 16/90328* (2019.01); *G06F 16/24578* (2019.01); *G06N 3/04* (2013.01)

(58) Field of Classification Search
CPC ........ G06F 16/90328; G06F 16/24578; G06N 3/04
See application file for complete search history.

(56) References Cited

U.S. PATENT DOCUMENTS 12,373,446 B1 * 7/2025 Fan ...................... G06F 16/248
2024/0193156 A1 6/2024 Lin et al.

OTHER PUBLICATIONS

Li et al. "A two-dimensional click model for query auto-completion." Proceedings of the 37th international ACM SIGIR conference on Research & development in information retrieval. 2014. (Year: 2014).*
Ren et al. "Unbiased learning to rank with biased continuous feedback." Proceedings of the 31st ACM International Conference on Information & Knowledge Management. 2022. (Year: 2022).*
Gui, Xiaoqiang, et al. "Calibration-compatible listwise distillation of privileged features for ctr prediction." Proceedings of the 17th ACM International Conference on Web Search and Data Mining. 2024. (Year: 2024).*
Bar-Yossef, et al., "Context-sensitive query auto-completion", In Proceedings of the 20th interna-tional conference on World wide web, 2011, pp. 107-116.

(Continued)

*Primary Examiner* — Jay A Morrison
(74) *Attorney, Agent, or Firm* — FIG. 1 Patents

(57) ABSTRACT

Listwise autocomplete ranking with position debias is described. A computing system can receive a user input indicative of a portion of a search query. The computing system can receive a set of candidate queries for an auto-complete list based on the portion of the search query. The computing system can generate a respective ranking score for each candidate query of the set of candidate queries by calculating, for each candidate query of the set of candidate queries, a respective click probability prediction using a position debiased listwise click-through rate (CTR) prediction model, and calculating, for each candidate query of the set of candidate queries, a respective reward per search. The computing system can order the set of candidate queries according to the respective ranking scores. The computing system can output at least one of the candidate queries based on the ordered set of candidate queries.

20 Claims, 7 Drawing Sheets

(56) References Cited

OTHER PUBLICATIONS

Block, et al., "Counterfactual learning to rank for utility-maximizing query autocompletion", SIGIR '22: The 45th International ACM SIGIR Conference on Research and Development in Information Retrieval, Madrid, Spain, Jul. 11, 2022, 12 pages.

Burges, Christopherj., "From Ranknet to Lambdarank to Lambdamart: An Overview", In Microsoft Research Technical Report MSR-TR-2010-82, Jun. 23, 2010, 19 pages.

Burges, Christopherj., "Learning to Rank with Nonsmooth Cost Functions", In Proceedings of the Advances in Neural Information Processing Systems, Dec. 2006, 8 pages.

Cai, et al., "A survey of query auto completion in information retrieval", Foundations and Trends® in Information Retrieval, 10(4), 2016, pp. 3 273-363.

Cai, et al., "Selectively personalizing query auto-completion", In Proceedings of the 39th International ACM SIGIR conference on Research and Development in Information Retrieval, 2016, pp. 993-996.

Cao, et al., "Learning to Rank: From Pairwise Approach to Listwise Approach", Proceedings of the 24th international conference on Machine learning, Jun. 2007, pp. 129-136.

Cheng, et al., "Wide & Deep Learning for Recommender Systems", Jun. 24, 2016, 4 pages.

Di Santo, et al., "Comparing approaches for query autocompletion", . In Proceedings of the 38th International ACM SIGIR Conference on Research and Development in Information Retrieval, 2015, pp. 775-778.

Gog, et al., "Efficient and effective query auto-completion", In Proceedings of the 43rd International ACM SIGIR Conference on Research and Development in Information Retrieval, 2020, pp. 2271-2280.

Guo, et al., "Pal: a position-bias aware learning framework for ctr prediction in live recommender systems", In Proceedings of the 13th ACM Conference on Recommender Systems, 2019, pp. 452-456.

Joachiims, et al., "Unbiased learning-to-rank with biased feedback", In Proceedings of the tenth ACM international conference on web search and data mining, 2017, pp. 781-789.

Liu, et al., "Learning to rank for information retrieval", Foundations and Trends® in Information Retrieval, 3(3), 2009, pp. 225-331.

Pobrotyn, et al., "Context- aware learning to rank with self-attention", arXiv preprint arXiv:2005.10084, 2020, 8 pages.

Shokouhi, et al., "Learning to personalize query auto-completion", In Proceedings of the 36th international ACM SIGIR conference on Research and development in information retrieval, 2013, pp. 103-112.

Singh, et al., "Multi-objective ranking to boost navigational suggestions in ecommerce autocomplete", In Companion Proceedings of the ACM Web Conference 2023, 2023, pp. 469-474.

Vaswani, et al., "Attention is all you need", Advances in Neural Information Processing Systems, 2017, pp. 5998-6008.

Wang, et al., "Learning to rank with selection bias in personal search", In Proceedings of the 39th International ACM SIGIR conference on Research and Development in Information Retrieval, 2016, pp. 115-124.

Whiting, et al., "Recent and robust query auto-completion", In Proceedings of the 23rd international conference on World wide web, 2014, pp. 971-982.

Yuan, et al., "Deep pairwise learning to rank for search autocomplete", arXiv preprint arXiv:2108.04976, 2021, 5 pages.

Zhao, et al., "Recommending what video to watch next: a multitask ranking system", In Proceedings of the 13th ACM Conference on Recommender Systems, 2019, pp. 43-51.

* cited by examiner

Figure 1:
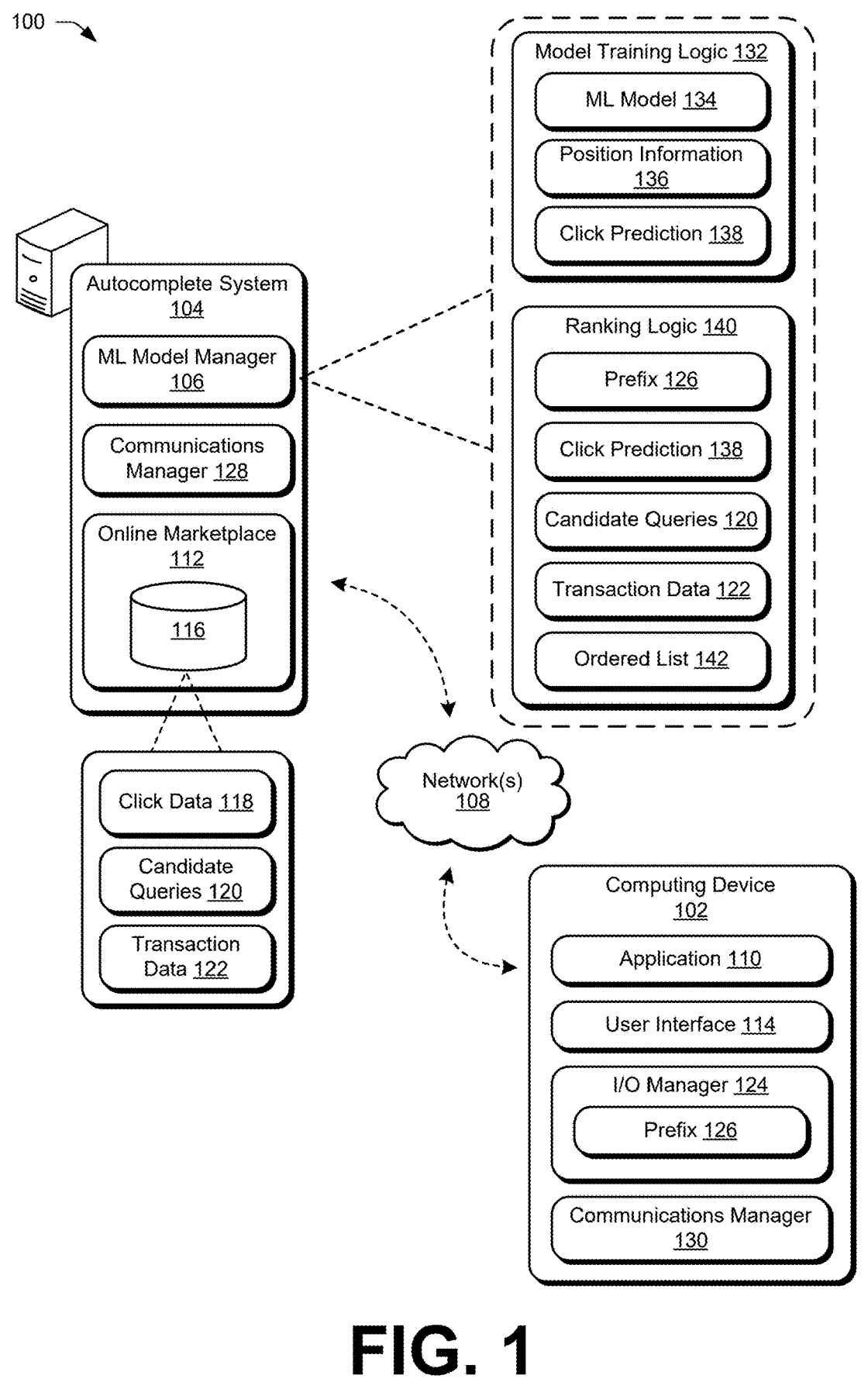

100

Model Training Logic 132

ML Model 134

Position Information 136

Click Prediction 138

Autocomplete System 104

ML Model Manager 106

Communications Manager 128

Online Marketplace 112

116

Ranking Logic 140

Prefix 126

Click Prediction 138

Candidate Queries 120

Transaction Data 122

Ordered List 142

Click Data 118

Candidate Queries 120

Transaction Data 122

Network(s) 108

Computing Device 102

Application 110

User Interface 114

I/O Manager 124

Prefix 126

Communications Manager 130

500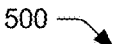

```
┌─────────────────────────────────────────────────────────┐
│                           502                             │
│    Receive a user input indicative of a portion of a      │
│                     search query                          │
└─────────────────────────────────────────────────────────┘
                             │
                             ▼
┌─────────────────────────────────────────────────────────┐
│                           504                             │
│  Receiving a set of candidate queries for an autocomplete │
│     list based on the portion of the search query         │
└─────────────────────────────────────────────────────────┘
                             │
                             ▼
┌─────────────────────────────────────────────────────────┐
│                           506                             │
│ Generate a respective ranking score for each candidate    │
│ query of the set of candidate queries by calculating, for │
│ each candidate query of the set of candidate queries, a   │
│ respective click probability prediction, and calculating, │
│ for each candidate query of the set of candidate queries, │
│         a respective reward per search                    │
└─────────────────────────────────────────────────────────┘
                             │
                             ▼
┌─────────────────────────────────────────────────────────┐
│                           508                             │
│ Order the set of candidate queries according to the       │
│            respective ranking scores                      │
└─────────────────────────────────────────────────────────┘
                             │
                             ▼
┌─────────────────────────────────────────────────────────┐
│                           510                             │
│ Output at least one of the candidate queries based on the │
│            ordered set of candidate queries               │
└─────────────────────────────────────────────────────────┘
```

FIG. 5

600 —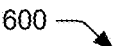

```
┌─────────────────────────────────────────────────────────────┐
│                            602                                │
│      Receive a user input indicative of a portion of a        │
│                       search query                            │
└─────────────────────────────────────────────────────────────┘
                              │
                              ▼
┌─────────────────────────────────────────────────────────────┐
│                            604                                │
│  Receive a set of candidate queries for an autocomplete list  │
│         based on the portion of the search query              │
└─────────────────────────────────────────────────────────────┘
                              │
                              ▼
┌─────────────────────────────────────────────────────────────┐
│                            606                                │
│  Generate a ranking score, respectively, for each candidate   │
│  query of the set of candidate queries by calculating, for    │
│  each candidate query of the set of candidate queries, a      │
│  respective click probability prediction by comparing,        │
│  jointly, each said candidate query to each other said        │
│              candidate query in the set                       │
└─────────────────────────────────────────────────────────────┘
                              │
                              ▼
┌─────────────────────────────────────────────────────────────┐
│                            608                                │
│  Order the set of candidate queries according to respective   │
│                   said ranking scores                         │
└─────────────────────────────────────────────────────────────┘
                              │
                              ▼
┌─────────────────────────────────────────────────────────────┐
│                            610                                │
│  Output at least one of the candidate queries based on the    │
│             ordered set of candidate queries                  │
└─────────────────────────────────────────────────────────────┘
```

FIG. 6

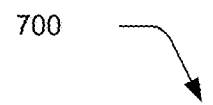
700
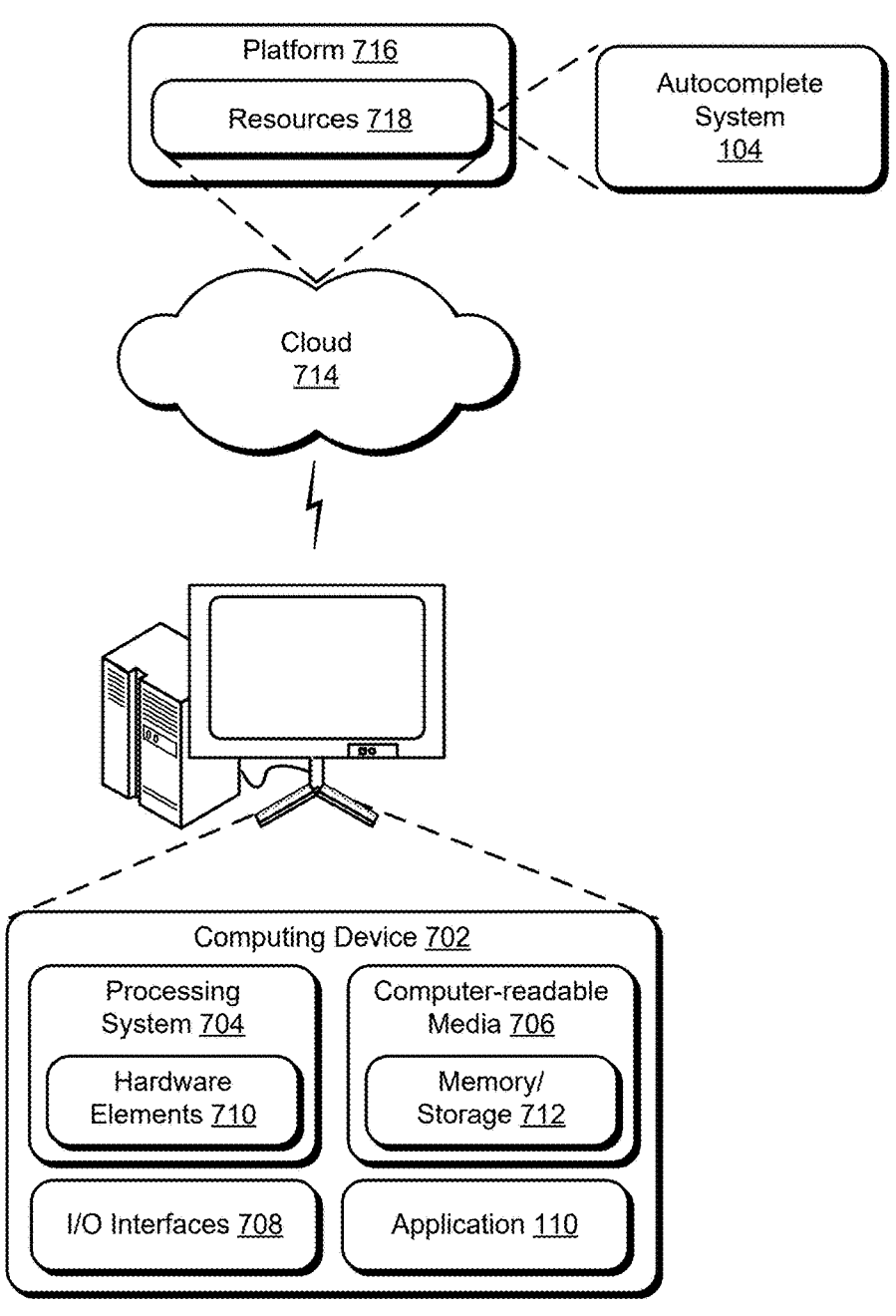
Platform 716
Resources 718
Autocomplete System 104
Cloud 714
Computing Device 702
Processing System 704
Hardware Elements 710
Computer-readable Media 706
Memory/ Storage 712
I/O Interfaces 708
Application 110
FIG. 7

LISTWISE AUTOCOMPLETE RANKING WITH POSITION DEBIAS

BACKGROUND

A computer system may implement machine learning techniques, or artificial intelligence, to generate an output given a prompt as input. For example, a computer system may utilize a machine learning (ML) model (e.g., a generative artificial intelligence (AI) model, a large language model (LLM)) to generate content, data, or outputs that were not explicitly programmed or provided to the ML model in training data. The ML model is trained using deep learning techniques (e.g., neural networks) to detect patterns and structures within the training data and can be utilized in a wide variety of environments and applications. As an example, an autocomplete system may employ an ML model to generate completion suggestions displayed in real-time to a user as the user types. However, many such autocomplete systems rely on relatively narrow or confined parameters that fail to consider contextual factors that can influence the user. Consequently, the generated completion suggestions may be inaccurate and ineffective.

SUMMARY

An autocomplete system receives a portion of a search query input by a user and generates a ranked list of candidate search queries to display to the user, where the candidate search queries are ranked using a listwise click-through rate (CTR) prediction model and estimated rewards per search. For example, the autocomplete system receives a set of candidate search queries (e.g., from an autocomplete database) to be suggested to the user based on the portion of the search query. The autocomplete system generates a respective ranking score for each candidate query by calculating, for each candidate query, a respective click probability prediction using the listwise CTR prediction model with position debias and a respective reward per search based on statistics associated with the candidate query. The autocomplete system orders the set of candidate queries according to the respective ranking scores. The autocomplete system displays at least one of the ordered candidate queries to the user. For instance, the autocomplete system may display a subset of the ordered candidate queries, such as a subset of candidate queries having a highest ranking score.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures.

FIG. 1 is an illustration of an environment in an example implementation that is operable to employ techniques described herein.

FIGS. 5 and 6 depict a procedure in an example implementation of listwise autocomplete ranking with position debias.

FIG. 7 illustrates an example of a system that includes an example computing device that is representative of one or more computing systems and/or devices that may implement the various techniques described herein.

DETAILED DESCRIPTION

Overview

Figure 2:
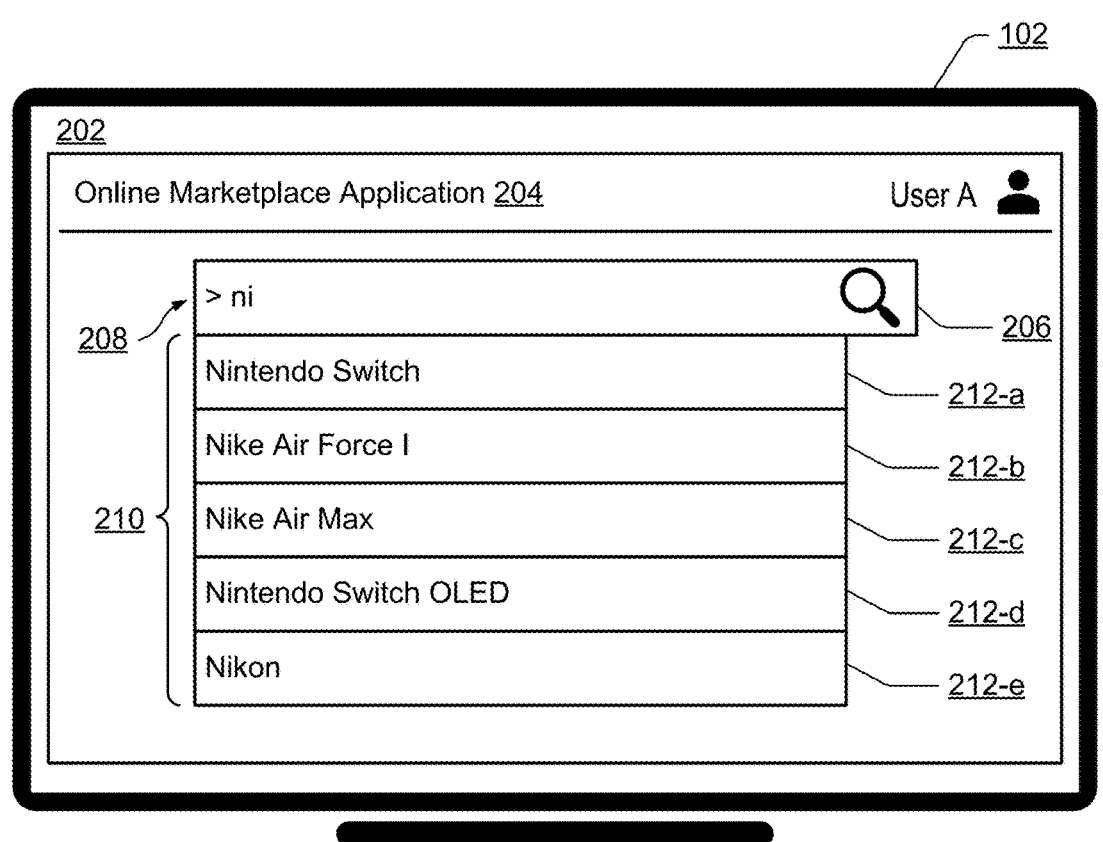
FIG. 2 depicts an example of a user interface in an example implementation of listwise autocomplete ranking with position debias.

Listwise autocomplete ranking with position debias is described. In accordance with the described techniques, an autocomplete system receives a portion of a search query, such as a word prefix, from a user. The autocomplete system retrieves (e.g., from an online database) a set of candidate search queries based on a match between the word prefix and the set of candidate search queries. The autocomplete system utilizes one or more machine learning (ML) models to generate a respective ranking score for each candidate search query, where the respective ranking score is based on a click probability prediction and an estimated reward per search. The one or more ML models may have an architecture that includes one or more transformer layers, a shallow tower, and one or more classification layers. The one or more ML models may include or be an example of a listwise click-through rate (CTR) prediction model that calculates a respective click probability prediction for each candidate search query by comparing each candidate search query to each other candidate search query in the set. The one or more ML models may implement the shallow tower that reduces an effect of positional bias on the respective ranking scores during training. The autocomplete system ranks the candidate search queries according to the ranking score and outputs an autocomplete list displayed to the user and including at least one candidate search query of the set of candidate search queries.

An online marketplace application may facilitate the exchange of items between users of the online marketplace application. For example, a seller may input data to the online marketplace application to be included in a listing of an item for sale on the online marketplace application, and a buyer may provide user input to initiate a transaction to purchase the item listed for sale. In some examples, the online marketplace application may include a relatively large numerical quantity of listings of items for sale (e.g., greater than a threshold value, millions of items per year). As such, to aid users in finding relevant listings, many online marketplace applications implement an autocomplete system (e.g., a query autocomplete (QAC) system) that suggests potential search queries to a user based on a portion of a search query input by the user. For example, the user may input a portion of a word, referred to herein as a prefix, into a search function of the online marketplace application. An autocomplete function of the online marketplace application may retrieve a set of potential search queries (e.g., complete words having the same prefix as the portion of the search query) from a database using a prefix match or a conjunctive match, and may rank the potential search queries according to a global ranking score. The autocomplete function may display, to the user, an autocomplete list including a subset of the potential search queries based on the global ranking score. By providing relevant search query suggestions, reducing typing effort, and improving ease of use, autocomplete functions increase search efficiency and enhance the user experience. Additionally, by guiding users toward popular or optimized search queries.

In some cases, however, the global ranking score may not provide particularly relevant or useful search queries. For instance, the global ranking score may be determined based on historical data, such as search history data, user behavior data, and the like, where more popular queries have a relatively higher ranking. However, such ranking may create considerable inertia for globally popular queries, resulting in less-relevant results for a particular user and/or a particular prefix. As another example, the global ranking may be based on user click data, which may be strongly biased by positions of the potential search queries within the autocomplete list. Here, the user may click on a potential search query simply because of the potential search query's relatively high position within the autocomplete list, rather than the user's intent. Additionally, the global ranking score may not consider conversion-oriented metrics relevant to online marketplaces, such as gross merchandise bought (GMB). Different search queries may inherently have different statistics for user clicks and transactions. For example, a relatively broad search query, such as "shoes," may be associated with a relatively high click probability, but may be less effective in facilitating transactions. In contrast, a user may be more likely to complete a transaction on a more specific search query, such as "women's Nike Air Max 270 size 7."

The techniques described herein provide an autocomplete system for an online marketplace application, where the autocomplete system balances queries that attract user click interest and the queries' eventual impact on online marketplace revenue, such as GMB. For example, the autocomplete system implements one or more ML models to generate a respective ranking score for each candidate search query based on a corresponding click probability and a corresponding expected transaction amount per search. The autocomplete system orders the set of candidate search queries according to the ranking scores and outputs at least one of the candidate search queries based on the ordering. For example, the autocomplete list may display (e.g., via a graphical user interface (GUI)) a subset of candidate search queries having a highest ranking score to the user. The user then selects a candidate search query from the subset of candidate search queries to use for searching the online marketplace application. By calculating the ranking scores using the techniques described herein (e.g., based on the click probabilities and expected transaction amounts), the autocomplete system can determine candidate search queries suggested to the user by the autocomplete system are relevant to both the user and the online marketplace application.

When calculating the click probability for a candidate search query, the ML models account for context information from each other candidate search query in the set of candidate search queries. Additionally, the ML models may include a shallow tower configured to remove positional bias from the ranking scores, such that a position of a candidate search query in the set of candidate search queries does not affect the corresponding ranking score. By removing positional bias when calculating the ranking scores, the autocomplete system can predict click probabilities for relevant candidate search queries with improved accuracy and efficiency.

In some aspects, the techniques described herein relate to a method, including receiving a user input indicative of a portion of a search query, receiving a set of candidate queries for an autocomplete list based on the portion of the search query, generating a respective ranking score for each candidate query of the set of candidate queries by calculating, for each candidate query of the set of candidate queries, a respective click probability prediction, and calculating, for each candidate query of the set of candidate queries, a respective reward per search, ordering the set of candidate queries according to the respective ranking scores, and outputting at least one of the candidate queries based on the ordered set of candidate queries.

In some aspects, the techniques described herein relate to a method, where calculating the respective click probability prediction includes inputting, to a listwise CTR prediction model, a set of feature vectors, each feature vector corresponding to a candidate query of the set of candidate queries, and comparing, jointly, each said feature vector to each other said feature vector in the set.

In some aspects, the techniques described herein relate to a method, where each feature vector includes at least one attribute of the portion of the search query, at least one statistic associated with the portion of the search query, at least one attribute of the corresponding candidate query, at least one statistic associated with the corresponding search query, or combinations thereof.

In some aspects, the techniques described herein relate to a method, further including training the listwise CTR prediction model using a shallow tower model to reduce an effect of positional bias on the respective click probability prediction calculated for each candidate query of the set of candidate queries.

In some aspects, the techniques described herein relate to a method, where the set of candidate queries are received based on a prefix match or a conjunctive match of each candidate query with the portion of the search query.

In some aspects, the techniques described herein relate to a method, where the outputting includes transmitting an indication of the autocomplete list including the at least one of the candidate queries to a device for display to a user.

In some aspects, the techniques described herein relate to a method, where the at least one candidate query includes a subset of candidate queries each having a respective ranking score above a threshold ranking score.

In some aspects, the techniques described herein relate to a method, where the autocomplete list includes the at least one of the candidate queries.

In some aspects, the techniques described herein relate to a method, including receiving a user input indicative of a portion of a search query, receiving a set of candidate queries for an autocomplete list based on the portion of the search query, generating a ranking score, respectively, for each candidate query of the set of candidate queries by calculating, for each candidate query of the set of candidate queries, a respective click probability prediction by comparing, jointly, each said candidate query to each other said candidate query in the set, ordering the set of candidate queries according to respective said ranking scores, and outputting at least one of the candidate queries based on the ordered set of candidate queries.

In some aspects, the techniques described herein relate to a method, where generating the ranking score includes using a listwise CTR prediction model to calculate the respective click probability prediction for each candidate query of the set of candidate queries, and calculating, for each candidate query of the set of candidate queries, a respective reward per search, where the respective ranking score for each candidate query is based on a product of the corresponding click probability prediction and the corresponding reward per search.

In some aspects, the techniques described herein relate to a method, further including inputting, to the listwise CTR prediction model, a set of feature vectors, each feature vector corresponding to a candidate query of the set of candidate queries.

In some aspects, the techniques described herein relate to a method, where each feature vector includes at least one attribute of the portion of the search query, at least one statistic associated with the portion of the search query, at least one attribute of the corresponding candidate query, at least one statistic associated with the corresponding search query, or combinations thereof.

In some aspects, the techniques described herein relate to a method, further including training the listwise CTR prediction model using a shallow tower model to reduce an effect of positional bias on the respective click probability prediction calculated for each candidate query of the set of candidate queries, and excluding the shallow tower model when generating the ranking score.

In some aspects, the techniques described herein relate to a method, where the set of candidate queries are received based on a prefix match or a conjunctive match of each candidate query with the portion of the search query.

In some aspects, the techniques described herein relate to a method, where the outputting includes transmitting an indication of the autocomplete list including the at least one of the candidate queries to a device for display to a user.

In some aspects, the techniques described herein relate to a method, where the at least one candidate query includes a subset of candidate queries each having a respective ranking score above a threshold ranking score.

In some aspects, the techniques described herein relate to a method, where the autocomplete list includes the at least one of the candidate queries.

In some aspects, the techniques described herein relate to a system, including at least one machine-learning model implemented using one or more processing devices, the at least one machine-learning model having an architecture including one or more transformer layers configured to receive training data including a list of text queries, a shallow tower configured to model positional bias of the text queries, one to another, and one or more classification layers configured to receive a result of processing by the one or more transformer layers and the shallow tower to reduce an effect of positional bias as modeled by the shallow tower on the result from the one or more transformer layers.

In some aspects, the techniques described herein relate to a system, where the text queries include one or more feature vectors.

In some aspects, the techniques described herein relate to a system, where the one or more feature vectors are indicative of one or more attributes of the text queries, one or more statistics associated with the text queries, or combinations thereof.

In the following discussion, an exemplary environment is first described that may employ the techniques described herein. Examples of implementation details and procedures are then described which may be performed in the exemplary environment as well as other environments. Performance of the exemplary procedures is not limited to the exemplary environment and the exemplary environment is not limited to performance of the exemplary procedures.

Example of a Autocomplete Ranking Environment

FIG. 1 is an illustration of an environment 100 in an example implementation that is operable to employ listwise autocomplete ranking with position debias techniques described herein. The environment 100 includes a computing device 102 and an autocomplete system 104. In some examples, the autocomplete system 104 includes an ML model manager 106 to train, fine-tune, and/or implement one or more ML models. In one or more implementations, the computing device 102 and the autocomplete system 104 are communicatively coupled, one to another, via network(s) 108. One example of the network(s) 108 is the Internet, although the computing devices 102 and the autocomplete system 104 may be communicatively coupled using one or more different connections or different networks (e.g., wireless networks) in various implementations.

Although the autocomplete system 104 is depicted in the environment 100 as being separate from the computing device 102, in one or more implementations, an entirety, or various portions, of the autocomplete system 104 are implemented at or by the computing device 102. In at least one implementation, the autocomplete system 104 is an example of a computing system that provides infrastructure and resources to support implementing one or more ML models at a computing device 102. For example, the computing device 102 may run an application 110 via the autocomplete system 104 that implements one or more ML models. In such examples, at least a portion of the autocomplete system 104 is implemented by the application 110 of the computing device 102 and/or using various resources of the computing device 102, such as hardware resources, an operating system, firmware, and so forth. Alternatively, or additionally, the autocomplete system 104 is implemented by server-based storage resources, processing resources, and so on of devices other than the computing device 102. For example, at least a portion of the autocomplete system 104 is implemented using a third-party service, such as a web services platform that provides one or more hardware and/or other computing resources to support provision of services by web service providers. In variations, an entirety, or various portions, of the autocomplete system 104 are implemented at or by a device of the user (e.g., a mobile device, a laptop, a wearable device, or any other device). In some examples, the device of the user is the computing device 102.

The computing device 102 that implements the environment 100 is configurable in a variety of ways. A computing device 102, for instance, is configurable as a desktop computer, a laptop computer, a mobile device (e.g., assuming a handheld configuration such as a tablet or mobile phone), an IoT device, a wearable device (e.g., a smart watch, a ring, or smart glasses), an augmented reality and/or virtual reality device (e.g., the smart glasses), a server, and so forth. Thus, a computing device 102 ranges from a full resource device with substantial memory and processor resources to a low-resource device with limited memory and/or processing resources. Although in instances in the following discussion reference is made to a computing device 102 in the singular, a computing device 102 may also be representative of multiple different devices, such as multiple servers of a server farm utilized to perform operations "over the cloud" as further described in relation to FIG. 7.

In at least one implementation, the application 110 supports communication of data across the network(s) 108 between the computing device 102 and the autocomplete system 104. By supporting such data communication, the application 110 provides a respective user of the computing device 102 (and users of other computing devices 102) access to an online marketplace 112. One example of the application 110 is a browser or other web application that facilitates user interaction with one or more features of the online marketplace 112. Another example of the application 110 is a web-based computer application, such as a mobile application or a desktop application, that facilitates user interaction with one or more features of the online marketplace 112. The application 110 may be configured in different ways, which enable users to interact with the computing device 102 and by extension perform actions to interact with the features of the online marketplace 112, without departing from the spirit or scope of the techniques described herein.

For example, the application 110 may interface with databases, user interfaces, and other software systems to receive inputs and deliver outputs. For example, a user interface 114 of the computing device 102 may include or be an example of a user interface of the online marketplace 112. Through interaction of a user with the user interface 114, the application 110 receives user input via the computing device 102. Examples of such input include, but are not limited to, receiving touch input in relation to portions of a displayed user interface, receiving one or more voice commands or other audio input, receiving typed input (e.g., via a physical or virtual ("soft") keyboard), receiving mouse or stylus input, and so forth. Based on the received user input, the application 110 causes various systems of the computing device 102 to output information associated with the online marketplace 112 via the user interface 114. For instance, the computing device 102 can display the user interface 114 via display devices or by making accessible voice-based user interfaces.

In one or more implementations, users register to obtain respective user accounts with the online marketplace 112. Such registration may include, for instance, providing an email address and establishing a username and password combination. In some examples, registration of a user via the computing device 102 facilitates signing into, or otherwise authenticating to, the user account in various ways, such as by receiving a username and matching password, receiving biometric information (e.g., at least one image captured of a face or information captured of another body part such as a thumb or finger) that suitably matches stored biometric information associated with the user account, and so forth.

Broadly speaking, the online marketplace 112 is configured to generate listings for items and to expose those listings (e.g., publish them) to the computing device 102. For example, the online marketplace 112 may generate listings for items for sale and expose those listings to computing device 102, such that the users of the computing device 102 can interact with the listings via the user interface 114 to initiate transactions (e.g., purchases, add to wish lists, share, and so on) in relation to the respective item or items of the listings. The online marketplace 112 is configured to generate listings for one or more items of various types of physical goods or property (e.g., components of a device or apparatus, accessories of a device or apparatus, clothing and/or clothing accessories, collectibles, furniture, decorative items, textiles, luxury items, electronics, real property, physical computer-readable storage having one or more video games stored thereon, and so on), services (e.g., babysitting, dog walking, house cleaning, and so on), digital items (e.g., digital images, digital music, digital videos) that can be downloaded via the network(s) 108, and blockchain backed assets (e.g., non-fungible tokens (NFTs)), to name just a few.

In the illustrated environment 100, the online marketplace 112 includes storage device 116, which is depicted as storing historical data associated with the online marketplace 112. The historical data includes, but is not limited to, click data 118, candidate queries 120, and transaction data 122. Additionally, or alternatively, the storage device 116 of the online marketplace 112 stores information related to one or more listings of items for sale, including real-time listing data for listings on the online marketplace 112, purchase history and/or transaction data (including transaction data 122) related to purchases of users (e.g., based on a user identifier from a user account, including a username of the account or other identifier), information input by the user, information inferred about the user based on the transaction data, or the like. The storage device 116 may represent one or more databases and/or other types of storage capable of storing the compatibility information. Examples of the storage device 116 include, but are not limited to, mass storage and virtual storage. In one or more implementations, for example, the storage device 116 may be virtualized across multiple data centers and/or cloud-based storage devices. The autocomplete system 104 may implement the online marketplace 112 by using servers that execute stored instructions to deploy various services of the autocomplete system 104, such that those services perform numerous computations which are effective to provide the functionality described above and below. It is to be appreciated that the online marketplace 112 may include more, fewer, or different components without departing from the spirit or scope described herein.

In variations, the computing device 102 may collect user input and provide information to a user using an I/O manager 124. The computing device 102 can receive user input via the I/O manager 124 that causes the computing device 102 to execute instructions, such as to cause the computing device 102 to transmit or receive data to and from the autocomplete system 104. For example, the computing device 102 can receive user input, such as a prefix 126, via one or more input components of the user interface 114. The user input may be in response to a request for user input from the computing device 102 and/or may be initiated by a user of the computing device 102. Based on receiving the user input via the user interface 114, the I/O manager 124 may trigger the computing device 102 to transmit data (e.g., including the prefix 126) to the autocomplete system 104. The I/O manager 124 may configure the computing device 102 to display, or otherwise present, controls that are selectable by a user to provide user input and/or prompts requesting user input. In some examples, the I/O manager 124 displays the controls and/or prompts to the user via a GUI of the computing device 102, such as a GUI associated with the user interface 114. In some other examples, the I/O manager 124 displays the request to the user via a GUI of another device communicatively coupled with the computing device 102 (e.g., another computing device 102 coupled with the computing device 102 via the networks 108). The I/O manager 124 can visually display the controls and/or the prompts, can emit an audio version of the controls and/or the prompts via an audio output component, or the like.

In some examples, the user interface 114 includes or is an example of a GUI associated with the application 110 and/or the online marketplace 112. A user may input information via interactable elements of the GUI (e.g., fill in a text element, elect a selectable element, or the like). For example, the user may input a prefix 126 into a search function of the application 110 to search for items listed for sale on the online marketplace 112. The prefix 126 may include or be an example of a portion of a search query, where the search query corresponds to a word that includes the prefix 126. As an example, the prefix 126 may be "bi", and the search query may be "bicycle," "binoculars," "bird feeder," etc. The application 110 may return a list of search results based on the prefix 126, where the list of search results includes one or more listings of items for sale on the online marketplace 112. The user may click on (i.e., select)

a listing to view the item and information associated with the listing, such as a price, a category, related items, or the like, and may, in some examples, purchase the item.

In some examples, the I/O manager 124 can store the information input by the user (e.g., at a local database) for access upon request by the autocomplete system 104. Additionally, or alternatively, the computing device 102 may transmit the information input by the user to the autocomplete system 104 for storage at the storage device 116. In some examples, the autocomplete system 104 may store the information input by the user with an associated user identifier (e.g., for a user account of the user that input the information). For example, the storage device 116 may store click data 118 indicative of clicks, by one or more users of the online marketplace 112, on listings, items, search terms, and the like, associated with the online marketplace 112. The click data 118 may indicate quantities of clicks, time periods in which clicks occurred, and categories of clicks, among other examples.

Additionally, or alternatively, the storage device 116 may store candidate queries 120 utilized by the autocomplete system 104 to provide autocomplete suggestions to a user of the computing device 102. For example, the candidate queries 120 may include or be an example of a precompiled index of search terms. When the user inputs a search query (e.g., a partial or complete word), such as the prefix 126, into a search function of the online marketplace 112. The autocomplete system 104 may retrieve the candidate queries 120 from an autocomplete service and may rank the candidate queries 120 using a global ranking score. The autocomplete service and/or the global ranking score may be implemented by a third-party service, such as Elasticsearch. In some examples, the autocomplete system 104 re-ranks the candidate queries 120 based on the generated ranking score described herein. The autocomplete system 104 can output a subset of the candidate queries 120 to the user as suggested query completions in an autocomplete list. For instance, the autocomplete system 104 may cause a user interface 114 of the application 110 to display the subset of the candidate queries 120 to the user via the computing device 102.

Additionally, or alternatively, the storage device 116 may store transaction data 122 indicative of previous purchases by one or more users of the online marketplace 112. In some examples, the online marketplace 112 may store transaction data 122 related to a purchase of an item. For example, a user may purchase a television, and the online marketplace 112 may store transaction data 122 indicating that the user (e.g., with an associated user account and/or user identifier) purchased the television, a price for which the item was purchased, time and date information of the transaction, and the like.

In some examples, the autocomplete system 104 and the computing device 102 implement a communications manager 128 and a communications manager 130, respectively, to support communication of data across the network(s) 108 between the computing device 102 and the autocomplete system 104. By supporting such data communication, the communications manager 128 and the communications manager 130 provide for the computing device 102 and the autocomplete system 104 to exchange data related to the application 110 for processing, storage, and/or distribution. The data can include, but is not limited to, an autocomplete list, the prefix 126, the click data 118, the candidate queries 120, and the transaction data 122, among other data.

In one or more implementations, the online marketplace 112 is accessible by decentralized computing devices that correspond to "clients" of the online marketplace 112 (e.g., users that have accounts with the online marketplace 112). In some cases, there may be different types of user accounts registered at the online marketplace 112. For example, the different types of user accounts may include seller user accounts and buyer user accounts. A seller user account may provide for a user to input information for listing items for sale via the online marketplace 112. A buyer user account may provide for a user to input transaction information for purchasing an item listed for sale via the online marketplace 112. The computing device 102 may display different user interfaces of the online marketplace 112 for a buyer account than for a seller account. In variations, the user account may be both a buyer account and a seller account, and a computing device 102 may include a control that is selectable to toggle between different user interfaces of the online marketplace 112. The user interfaces may include different GUI displays, referred to as a seller display and a buyer display. For a seller display, the computing device 102 may display one or more controls selectable by the user to provide information related to a listing of an item for sale and/or prompts for the user to provide information related to the listing of the item for sale. The controls may include options for selecting a type and/or category of the item, selecting from a list of characteristics for the item based on inputting information about the item, or the like. The prompts may include a prompt to provide information about the item for sale, including a description of the item, a category of the item, a price for the item, and/or a condition of the item (e.g., new, used, etc.), among other information.

For a buyer display, the computing device 102 may display a search function for searching for an item from the item listings. Once a user inputs a search query for an item, then the computing device 102 may display search results that are selectable by the user. A search result may include one or more listings corresponding to one or more items for sale with a title and/or information within a threshold match of the search query (e.g., a threshold numerical quantity of matching characters and/or string values of the search query and an item title and/or other information about an item). If the computing device 102 receives a selection of a search result, then the computing device 102 may display additional information about an item corresponding to the search result and one or more controls and/or prompts for the user to select an item for purchase.

To improve search efficiency and accuracy, the autocomplete system 104 may implement one or more ML models to predict and suggest, in real time, possible search queries to a user as the user provides input to a search function of the online marketplace 112. In one or more implementations, the autocomplete system 104 implements the ML model manager 106 that trains, fine-tunes, and/or implements the one or more ML models. In one or more implementations, the autocomplete system 104 implements the ML model manager 106 by using servers that execute stored instructions to deploy various services of the autocomplete system 104, such that those services perform numerous computations which are effective to provide the functionality described above and below. It is to be appreciated that the ML model manager 106 may include more, fewer, or different components without departing from the spirit or scope described herein.

In this example, the ML model manager 106 includes, or otherwise has access to, model training logic 132. The ML model manager 106 can utilize the model training logic 132 to train or fine-tune one or more ML models, such as an ML model 134. The ML model manager 106 or another entity (e.g., a third-party computing system) may train the ML model 134 on relatively large datasets (e.g., greater than a threshold amount of data) to establish and/or improve a performance of the ML model 134. The ML model manager 106 can be an example of software (e.g., logic) and/or hardware (e.g., processor and/or memory) that is configured to maintain and implement the ML model 134. The ML model 134 may include or be an example of one or more computational algorithms or systems designed to process input data, recognize patterns, and generate outputs or make decisions without being explicitly programmed for a specific task. For example, the ML model 134 includes or is an example of a listwise ML model that calculates (e.g., generates, predicts) a click probability for each candidate query 120 of a set of candidate queries 120. The autocomplete system 104 implements the ML model 134 (e.g., via the ML model manager 106) to generate an autocomplete list including at least one candidate query 120 based on the calculated click probabilities, e.g., in response to user input of a search function of the online marketplace 112.

Due to the relatively large numerical quantity of items listed for sale on the online marketplace 112, a user may be unable to manually search through the online marketplace 112 with sufficient efficiency. Additionally, conventional autocomplete techniques may generate results that are biased with respect to position and popularity, thereby decreasing accuracy. As an example, in conventional applications, such as recommender systems, pointwise CTR models may be utilized for CTR predictions because such CTR predictions can be interpreted as a click probability having a clear physical meaning. For example, a pointwise model may learn a function $f$: $\mathbb{R}^d \rightarrow \mathbb{R}^1 \in [0,1]$ to compute the click probability for a query with d-dimensional features. The pointwise model may take only a single query as an input, and may treat each prefix-candidate query pair as a single sample to predict a click probability using a sigmoid function. In some examples, the pointwise model is built on a 6-layer neural network with ReLU activation and is trained using binary cross-entropy (BCE) loss.

The pointwise model may make an independent and identically distributed (i.d.d.) assumption, which does not hold in autocomplete systems (such as the autocomplete system 104), as users typically view a list of suggestions before making a click decision. That is, in autocomplete systems, each query is not independent nor identically distributed, as each query exists within the context of a set of queries displayed to the user, such as within a list of autocomplete suggestions from which the user selects a query. Thus, a CTR prediction output by a pointwise model may not account for the impact of the presence of multiple other queries and/or the query's context, and as such, may not accurately represent real-world scenarios.

In contrast, the ML model 134 includes or is an example of a listwise ML model that accounts for context information from all the candidate queries 120 when calculating a click prediction for a given candidate query 120. As described with reference to FIG. 3, the ML model 134 is built on 4-layer transformer blocks with 4-head attention, without positional encoding, and is trained using a listwise loss function. The context information includes, but is not limited to, characteristics of the prefix 126 (e.g., a character length, a token count), statistics of the prefix 126 (e.g., a quantity of clicks, a change in the quantity of clicks over a time period), characteristics of the candidate query 120 (e.g., a character length, a token count), statistics of the candidate query 120 (e.g., revenue-related statistics, impression statistics, popularity levels, category information), comparison information between the prefix 126 and the candidate query 120 (e.g., n-gram similarities, saved keystrokes), user behavior statistics (e.g., user data, historical data, user clicks) or combinations thereof. The context information may be obtained by the autocomplete system 104 from the storage device 116, such as from the click data 118 and the transaction data 122. Additionally, or alternatively, the context information may be obtained by the autocomplete system 104 from the computing device 102. For example, the autocomplete system 104 may receive user data or other user information from the computing device 102 via the network(s) 108. The ML model 134 receives, as inputs, a set of multiple d-dimensional feature vectors associated with multiple candidate queries 120 and can output multiple click probabilities at once. For instance, the ML model 134 calculates a respective click probability for each candidate query 120 using the feature vectors associated with all candidate queries 120.

By implementing the ML model 134, the autocomplete system 104 is able to predict and suggest debiased search queries for the user according to historical data and user behavior. As a result, the autocomplete system 104 and the computing device 102 can increase search efficiency and accuracy, which may, in turn, decrease computational resource usage and processing. For example, providing the user with suggested search queries using the ML model 134 can enable the user to locate a desired product or listing without performing multiple searches, thus eliminating additional processing by the computing device 102 and the autocomplete system 104.

For example, a user may input a portion of a search query, represented by the prefix 126, into a search function of the application 110 via the user interface 114 of the computing device 102 to search through listings of the online marketplace 112. The computing device 102 transmits the prefix 126 via the network(s) 108 to the autocomplete system 104. The autocomplete system 104 receives the prefix 126 and retrieves the candidate queries 120 from the storage device 116. In some examples, the autocomplete system 104 selects the candidate queries 120 from a precompiled index of search queries based on a prefix match or a conjunctive match with the prefix 126. For instance, the autocomplete system 104 compares the prefix 126 with the search queries in the precompiled index and identifies and selects, from among the search queries, a set of candidate queries 120 that begin with or closely match the prefix 126. Each candidate query 120 of the candidate queries 120 may be associated with a global ranking score, which may be stored in the storage device 116 or in a database or other storage accessible by the ML model manager 106 (e.g., via the network(s) 108).

The ML model 134 is configured to receive, as inputs, the click data 118, the candidate queries 120, the prefix 126, the transaction data 122, and position information 136. The position information 136 may correspond to or otherwise represent a respective position of each candidate query 120 according to the candidate query's global ranking score. The ML model 134 calculates a respective click probability prediction, such as the click prediction 138, for each candidate query 120 using the inputs as described in greater detail with reference to FIG. 3. A click probability may be defined as a probability that a user clicks on search query displayed within an autocomplete list.

For example, the ML model 134 includes or is an example of a listwise CTR prediction model (e.g., a deep learning model) having an architecture that includes one or more transformer layers, a shallow tower, and one or more classification layers. A candidate query 120 is represented by a d-dimension feature vector that includes d features, where the d features are based on click data 118 and transaction data 122 associated with the candidate query 120, which is described in greater detail with reference to FIG. 3. As an example, a feature vector representing a candidate query 120 includes at least one attribute of the prefix 126, at least one statistic associated with the prefix 126, at least one attribute of the candidate query 120, at least one statistic associated with the candidate query 120, or some combination thereof.

The one or more transformer layers receive the feature vectors corresponding to the candidate queries 120 as inputs. The one or more transformer layers process the feature vectors by comparing, jointly, each feature vector corresponding to a candidate query 120 to each other feature vector corresponding to a candidate query 120. In this manner, the ML model 134 is a "listwise" model in that the ML model 134 accounts for context information from all the candidate queries 120 when calculating the click prediction 138 for a given candidate query 120.

The shallow tower models positional bias using position information 136 associated with the candidate query 120. The one or more classification layers receive a result of processing by the one or more transformer layers and the shallow tower and remove positional bias as modeled by the shallow tower on the result of the one or more transformer layers. The one or more classification layers output a respective click prediction 138 for each candidate query 120. In implementations, the model training logic 132 includes the shallow tower and the position information 136 when training the ML model 134 (e.g., as described with reference to FIG. 3), but does not include the shallow tower during inference (e.g., when implementing the ML model 134 in an online setting, such as described with reference to FIG. 2).

The ML model manager 106 can further include, or otherwise have access to, ranking logic 140. The autocomplete system 104 utilizes the ranking logic 140 to rank the candidate queries 120 by generating a ranking score (e.g., different from the global ranking score) for each candidate query 120 according to the click predictions 138 (e.g., calculated by the ML model 134 for the candidate queries 120) and an estimated reward (e.g., revenue) per search associated with each candidate query 120. For example, the ranking logic 140 can include instructions to input (e.g., by the autocomplete system 104, such as via the ML model manager 106), to the ML model 134, the prefix 126, the click predictions 138, the candidate queries 120, and the transaction data 122. The ML model 134 calculates a respective estimated reward per search for each candidate query 120 using the transaction data 122.

The estimated reward per search may include or be an example of an estimated revenue of the online marketplace for a search of the corresponding query (e.g., a candidate query 120). The reward per search may be equivalent to one or more transaction-related metrics, such as gross merchandise bought (GMB). The GMB for a query q may be defined, under user context ctx (e.g., context information, including the prefix 126), as $\mathbb{E}(T_q|ctx)$, which can be further decomposed into the product of two conditional probabilities, as well as the average price per transaction, as shown in Equation 1 below.

In Equation 1, $P(q_c|ctx)$ is defined as the click probability $q_c$ of query q under context ctx, where ctx includes the prefix 126 input by the user, features of the user, candidate queries 120, other search queries input by the user in the search session, etc. Similarly, $P(q_p|q_c, ctx)$ is defined as a purchase probability. The purchase probability can be understood as a likelihood that the query q leads to a transaction (e.g., a single purchase) by the user when a click (represented by $q_c$) occurs under the context ctx. The click probability is represented by $q_p$. Additionally, $\mathbb{E}(\mathcal{P}_q)$ is the expected value of the transaction (e.g., the purchase price) $\mathcal{P}_q$ for the query q. In the second line of Equation 1, it is assumed that the user's clicks on the query q and the transaction are independent, such that $P(q_p|q_c, ctx) \cong P(q_p|ctx)$. In the third line of Equation 1, it is assumed that the context ctx features are independent of a purchase probability, represented as $P(q_b)$. Accordingly, the GMB for a query q (e.g., $\mathbb{E}(T_q|ctx)$) represents an expected transaction for the query q under context ctx that can be further simplified as a click probability for the prefix (e.g., $P(q_c|ctx)$) multiplied by an average revenue generated from one search of the query q (e.g., the average price per transaction), represented by $\mathbb{E}(\mathcal{G}_q)$. $\mathbb{E}(\mathcal{G}_q)$ may also be defined or understood as an expected GMB (eGMB).

The ML model 134 may calculate, for each candidate query 120, a respective ranking score corresponding to the debiased click prediction and/or based on the expected transaction represented by $\mathbb{E}(T_q|ctx)$ as shown in Equation 1. For example, the ML model 134 generates a respective ranking score for a candidate query 120 (e.g., a query q) based on a product of the corresponding click prediction 138 and the corresponding reward per search. The reward per search may be the eGMB. Generation of the ranking score can be decomposed into two parts: (1) a CTR prediction for the context of each query q, and (2) the estimation of eGMB. As described above, the CTR prediction is implemented using the ML model 134 (e.g., a listwise ML model) to account for the context ctx. Calculation of a respective eGMB for each query q can be performed (e.g., by the autocomplete system 104, such as via the ML model 134), based on an ergodic hypothesis, using statistical methods for estimation rather than through models, as shown in Equation 2 below.

$$\mathbb{E}(\mathcal{G}_q) = \frac{\sum_j \left(G_q^{(j)}\right)}{\sum_j \mathbb{1}_{q^{(j)}}} \tag{2}$$

In Equation 2, $\mathbb{E}(\mathcal{G}_q)$ represents the eGMB for a query q, and j represents all search event instances for the query q. $\Sigma_j \mathbb{1}_{q^{(j)}}$ represents all search event instances of the query q in a time period, and $$\sum_j \left(G_q^{(j)}\right)$$

represents a total GMD for the query q in the same time period. If the query q lacks transaction data within the transaction data 122, the autocomplete system 104 may default to using a relatively small value for the eGMB value.

The ML model 134 calculates a respective eGMB for each candidate query 120 using Equation 2 and calculates a $$\mathbb{E}(T_q|ctx) = P(q_c|ctx) \cdot P(q_p|q_c, ctx) \cdot \mathbb{E}(\mathcal{P}_q) \tag{1}$$

$$\mathbb{E}(T_q|ctx) \simeq P(q_c|ctx) \cdot P(q_p|ctx) \cdot \mathbb{E}(\mathcal{P}_q)$$

$$\mathbb{E}(T_q|ctx) \simeq P(q_c|ctx) \cdot \mathbb{E}(\mathcal{G}_q)$$

respective ranking score for each candidate query 120 based on a product of the corresponding click prediction 138 and the corresponding eGMB. The ML model 134 orders the candidate queries 120 according to the ranking scores and outputs an ordered list 142 that includes at least one of the candidate queries 120.

Figure 4:
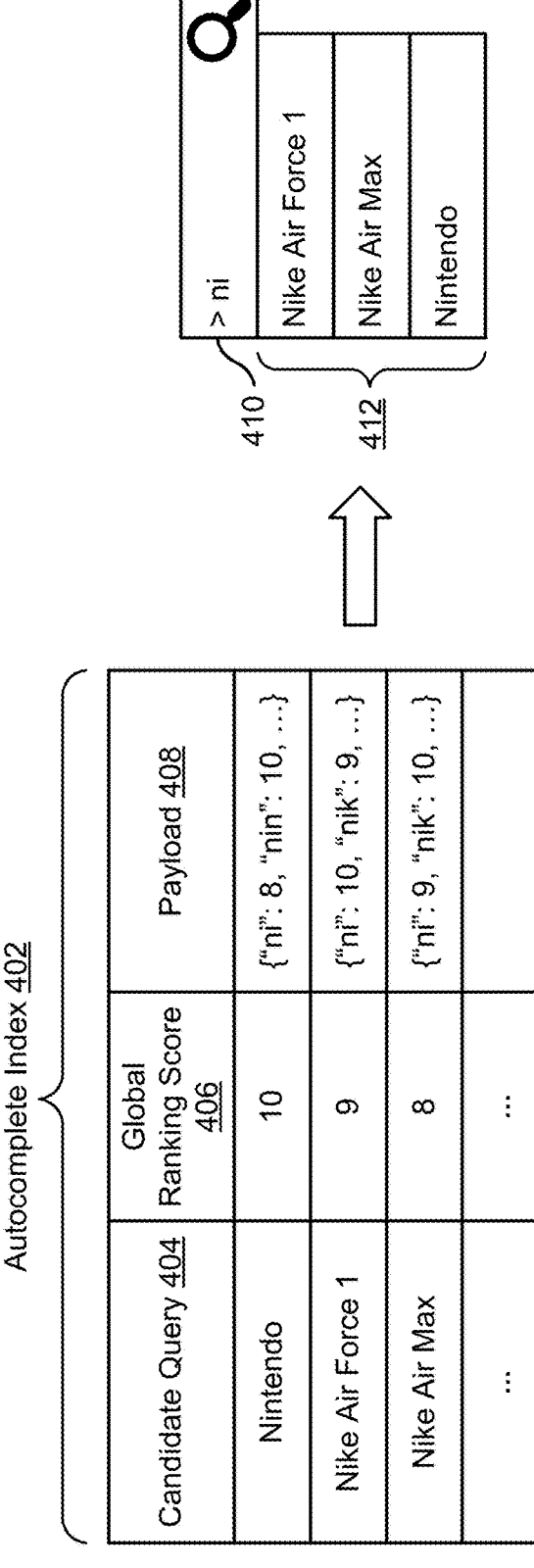
FIG. 4 depicts an example of a ranking results in an example implementation of listwise autocomplete ranking with position debias.

The ordered list 142 may include or be an example of an autocomplete list displayed to the user in response to the user input of the prefix 126. For example, the ordered list 142, or an indication of the ordered list 142, is transmitted via the network(s) 108 to the computing device 102 for display via the user interface 114. The ordered list 142 may be displayed as an autocomplete list that is part of the search function of the online marketplace 112 as illustrated in FIGS. 2 and 4. In implementations, the ordered list 142 includes a subset of the candidate queries 120. As an example, the ordered list 142 may include a quantity of candidate queries 120 that are each associated with a respective ranking score above a threshold ranking score. Additionally, or alternatively, the quantity may be less than or equal to a total quantity of the candidate queries 120. For example, the ordered list 142 may include a top five candidate queries 120 having the highest ranking scores from among the candidate queries 120, or may include a quantity of candidate queries 120 having ranking scores that are above a threshold ranking score.

In some examples, the ML model 134 implements or includes various types of AI models and/or ML models, such as neural networks, decision trees, or support vector machines, which can be adapted to handle diverse tasks ranging from natural language processing to image recognition. Example ML models include, but are not limited to, LLMs and/or conditional generative models. An LLM is a type of AI model designed to understand and generate a natural language response to a prompt or other input. In some examples, LLMs are pre-trained on a diverse text data set to learn structure, grammar, and semantics of language. A conditional generative AI model is an AI model designed to generate an output using one or more input conditions or labels. ML models such as the ML model 134 may be built using deep learning techniques and may have a greater numerical quantity of parameters than other AI models. Unlike conventional AI systems that rely on rule-based or deterministic approaches, generative AI employs algorithms and models capable of autonomously producing output that closely resembles human-generated content. These algorithms are designed to learn patterns and structures from existing data and then use this learned information to generate new content that is coherent, relevant, and contextually appropriate.

Having considered an example of an environment, consider now a discussion of some example details of the techniques for listwise autocomplete ranking with position debias in accordance with one or more implementations.

Listwise Autocomplete Ranking with Position Debias

FIG. 2 depicts an example 200 of a user interface for listwise autocomplete ranking with position debias. The example 200 can be implemented by aspects of the environment 100. For example, the example 200 can be implemented by an autocomplete system (e.g., an autocomplete system 104), as described with reference to FIG. 1.

The example 200 includes a user interface 202 of a computing device 102, which is an example of the corresponding device as described with reference to FIG. 1. The user interface 202 can be an example of a GUI. The computing device 102 can display an instance of an online marketplace application 204. The instance of the online marketplace application 204 may be associated with a user account (e.g., a buyer user account) with a corresponding identifier. The identifier may be a username for the user account (e.g., "User A").

The online marketplace application 204 includes one or more features that a user may interact with. For example, the user interface 202 includes a search feature 206. The search feature 206 may prompt for a user to input a search term or search query, such as a string and/or character value. For example, the search feature 206 may include an option for the user to provide text input (e.g., natural language text), which may include or be an example of a search query or a portion of a search query. A portion of a search query may be understood as a portion of a word, such as a prefix 208 including at least one letter. In the example of FIG. 2, the prefix 208 is "ni". The online marketplace application 204 propagates one or more results using the search query.

Once the user provides input, such as the prefix 208, then the autocomplete system obtains the prefix 208 from the computing device 102 (e.g., over a network if the autocomplete system is implemented independent of the computing device 102 or an internal processor of the computing device 102 if the autocomplete system is implemented at the computing device 102). The autocomplete system processes the prefix 208 to obtain an output including at least one candidate query to suggest to the user, as described with reference to FIG. 1. The candidate queries may be search queries in the form of complete words or phrases that share a same prefix as the prefix 208. The output may include or be an example of an autocomplete list 210 that includes the at least one candidate query. In the example of FIG. 2, the autocomplete list 210 includes five candidate queries (e.g., candidate query 212-*a*, candidate query 212-*b*, candidate query 212-*c*, candidate query 212-*d*, and candidate query 212-*e*) that each have a prefix matching the prefix 208.

For example, the autocomplete system retrieves a set of candidate queries corresponding to the prefix 208 and utilizes a listwise CTR model, such as the ML model 134 described with reference to FIG. 1, to calculate a respective click probability prediction for each candidate query. The listwise CTR model receives, as inputs, a set of feature vectors, each feature vector corresponding to one candidate query and including attributes or statistics associated with the prefix 208 and/or the corresponding candidate query. The listwise CTR model calculates the respective click probability predictions by comparing, jointly, each feature vector to each other feature vector in the set of feature vectors.

Additionally, the autocomplete system calculates a respective reward per search for each candidate query. The autocomplete system can utilize the click probability predictions and the rewards per search to generate a respective ranking score for each candidate query. The autocomplete system orders (e.g., re-ranks) the set of candidate queries according to the respective ranking scores (stored in the "payload" field) and outputs at least one candidate query based on the ordering. For example, the autocomplete system may output a subset of candidate queries, such as a preconfigured quantity of candidate queries having a highest ranking score (e.g., a "top five," a "top ten," etc.). Additionally, or alternatively, the subset of candidate queries can include a quantity of candidate queries having ranking scores that satisfy (e.g., are above) a threshold ranking score.

The computing device 102 obtains the output from the autocomplete system. For example, the autocomplete system can broadcast or otherwise transmit the output to the computing device 102 and/or to a user via the user interface 202. That is, broadcasting and/or transmitting the output can include a transmission of data including the output between physical devices via a network, such as the network(s) 108 as described with reference to FIG. 1. Additionally, or alternatively, broadcasting and/or transmitting the output can include displaying the output via a user interface 202 of a computing device 102. The computing device 102 displays the output via the user interface 202. For example, the computing device 102 displays, via the user interface 202, the autocomplete list 210 to the user, including the candidate queries 212. In some examples, the user interface 202 includes interactive elements for the autocomplete list 210 that provide for a user to select a candidate query 212 from the autocomplete list 210. When the user selects a candidate query 212, the user interface 202 initiates a search function of the online marketplace application 204 using the candidate query 212. For instance, based on user selection of a candidate query 212, the user interface 202 may automatically search the online marketplace application 204 for one or more listings that match the selected query.

Figure 3:
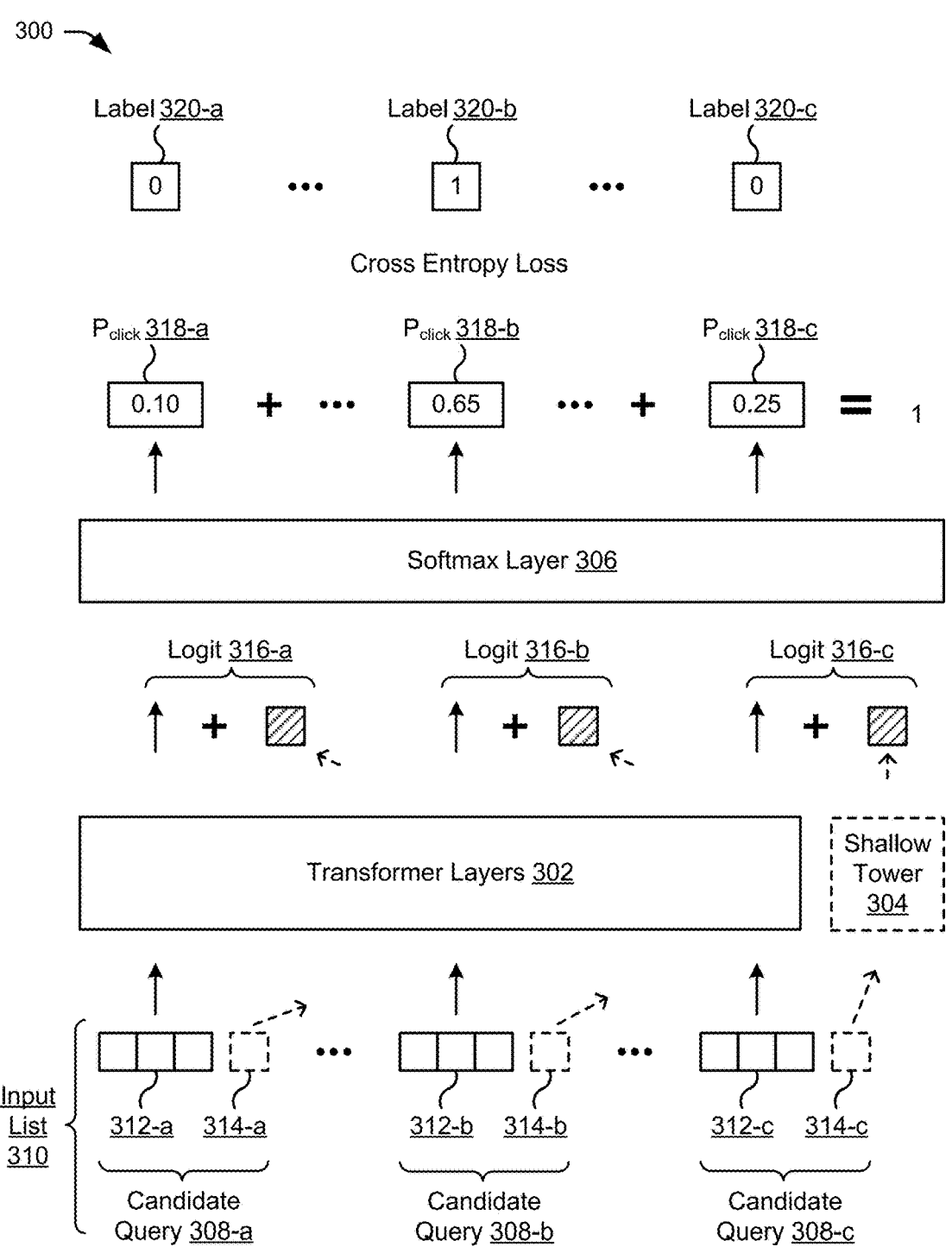
FIG. 3 depicts an example of an ML model architecture in an example implementation of listwise autocomplete ranking with position debias.

FIG. 3 depicts a listwise ML model architecture 300 in an example implementation of listwise autocomplete ranking with position debias. The listwise ML model architecture 300 may implement, or be implemented by, aspects of FIG. 1. For example, the listwise ML model architecture 300 may be implemented by an ML model (e.g., a listwise ML model) of an autocomplete system, such as the ML model 134 and the autocomplete system 104, respectively, as described with reference to FIG. 1.

In one or more implementations, the ML model architecture 300 includes transformer layers 302, a shallow tower 304, and a softmax layer 306. The transformer layers 302 are configured to receive training data including a list of text queries, such as candidate queries. The shallow tower 304 is configured to model positional bias of the text queries. The softmax layer 306 includes or is an example of one or more classification layers configured to receive a result of processing by the transformer layers 302 and the shallow tower 304 to reduce an effect of positional bias (e.g., as modeled by the shallow tower 304) on the result from the one or more transformer layers 302.

The ML model implementing the listwise ML model architecture 300 receives user input indicating a portion of a search query, such as a prefix (e.g., the prefix 126). The autocomplete system retrieves a set of candidate queries 308 corresponding to the prefix and provides the set of candidate queries 308 to the ML model as an input list 310. The input list 310 may include or be an example of a list of text queries. The ML model generates a respective click probability prediction for each candidate query 308.

The set of candidate queries 308 may include a quantity n of candidate queries 308. As described with reference to FIG. 1, for a given context associated with the prefix and a set of n candidate queries 308, the set of candidate queries 308 may be represented as X and each candidate query 308 in the set may be represented as x. Each candidate query 308 in the set of candidate queries 308, e.g., $x \in X$, is represented as a feature vector 312 with d dimensions. Thus, the input list 310 includes a quantity of n feature vectors 312. The feature vector 312 for each candidate query 308 is analogous to a token embedding. In the example of FIG. 3, the candidate queries 308 include a candidate query 308-*a*, a candidate query 308-*b*, and a candidate query 308-*c*, such that n is equal to three (3). It is to be understood that the quantity n may vary based on the context associated with the prefix. The ML model calculates the click probability predictions for the candidate queries 308 according to a scoring function shown in Equation 3 below.

$$f: \mathbb{R}^{d \times n} \to \mathbb{R}^{1 \times n} \tag{3}$$

As illustrated by Equation 3, the input to the ML model may be represented as a matrix of real numbers of dimension d×n, where each column of the matrix is a d-dimensional vector such as a feature vector 312. The ML model implements the function $f$ to operate on each feature vector 312 and returns a single scalar value for each feature vector 312. Each scalar value represents a respective click probability for a candidate query 308.

The feature vectors 312 include features of various types, such as textual features, behavioral statistics, and the like, and may be obtained by the autocomplete system from the click data 118, the transaction data 122, the computing device 102, or other sources. A feature may be defined as an individual, measurable property (e.g., variable, attribute, characteristic) of the corresponding candidate query 308 and may be numerical, categorical, or natural language text. Example feature categories may include, but are not limited to, prefix-level features (e.g., characterizing the prefix input by the user), candidate-level features (e.g., characterizing a candidate query 308), and prefix-candidate level features (e.g., characterizing differences and similarities between the prefix and a candidate query 308). Textual features may include a character length, a token count, and the like, among other examples. Statistical features associated with the prefix may include a quantity of searches and/or clicks. Statistical features associated with a candidate query 308 may include a quantity of impressions, a GMB value, a quantity of items purchased, a recall value, a feature crossing, and the like. Prefix-candidate level features may include an n-gram similarity, a saved keystroke, a binary indication of whether the prefix and the candidate query 308 are equal, and so forth.

In the listwise ML model architecture 300, the transformer layers 302 are configured to receive the feature vectors 312. The transformer layers 302 include self-attention layers that take into account all of the candidate queries 308 present in the input list 310 and output click probabilities for all of the candidate queries 308. A self-attention layer may include one or more attention heads. An attention function of an attention head can be defined as mapping a query Q and a set of key-value pairs to an output, where the query Q, keys K, values V, and output are all vectors. The output is computed as a weighted sum of the values, where the weight assigned to each value is computed by a compatibility function of the query with the corresponding key. Thus, each attention head focuses on a specific aspect or feature of the input relationships and learns to attend to different patterns or dependencies in the input data.

Within each layer of the transformer layers 302 are located multiple attention heads, each attention head corresponding to features being independently used for computing a scaled dot-product self-attention function as shown in Equation 4 below. In Equation 4, $$\frac{1}{\sqrt{d_h}}$$

is a scaling factor added to avoid small gradients in the softmax operator.

$$\text{Attention}(Q, K, V) = softmax\left(\frac{QK^T}{\sqrt{d_h}}\right)V \qquad (4)$$

It is worth nothing that in traditional transformer architecture, positional encoding is introduced as a marker for positional information. In the example of FIG. 3, however, positional information of each candidate query 308 is unknown during the inference process, and as such, the positional encoding layer is removed, allowing the feature fusion of each query to rely solely on attention rather than an input position.

For a given prefix, click signals, such as the click data 118 described with reference to FIG. 1, are used as labels, where a positive sample corresponds to a clicked query and a negative sample corresponds to an unclicked query. However, such implicit feedback may be strongly biased by positions, as click signals are derived from results of previous ranking models in the autocomplete system. That is, a global ranking score for a candidate query 308 may be based on a ranking model that does not debias for position, but a user may be more likely to click on a candidate query 308 based on its position in the autocomplete list rather than a user preference. Put another way, a user may be influenced by the presence of all candidate queries 308 in the autocomplete list and/or the position of each candidate query 308 in the autocomplete list. Additionally, each ranking model may be based on previously-implemented ranking models such that the position bias increases over time. As such, training the ML model using such data introduces bias and results in inaccurate click probability estimation.

To remove position bias, the listwise ML model architecture 300 implements the shallow tower 304 to model the position bias and explicitly remove its impact before outputting final click probabilities. Each candidate query 308 is associated with a position 314 input to the shallow tower 304. Each candidate query 308 is further associated with a respective logit 316, which is produced as a summation of the corresponding output of the transformer layers 302 and the corresponding output of the shallow tower 304.

The logits 316 are input to the softmax layer 306, which includes a softmax operation to convert the logits 316 to probabilities, such as click probabilities. The softmax layer 306 ensures that the resulting outputs, illustrated as click probabilities $P_{click}$ 318, are non-negative and sum to 1. A probability $p_i$ for a candidate query 308 is given by Equation 5.

$$p_i = softmax_i(l + d) \qquad (5)$$

In Equation 5, $p_i$ corresponds to a click probability $P_{click}$ 318, 1 represents a vector including the outputs from the transformer layers 302, and d represents a vector including the outputs from the shallow tower 304. As illustrated, the candidate query 308-a is associated with a click probability $P_{click}$ 318-a having a value of 0.10, the candidate query 308-b is associated with a click probability $P_{click}$ 318-b having a value of 0.65, and the candidate query 308-c is associated with a click probability $P_{click}$ 318-c having a value of 0.25. It should be noted that the click probabilities $P_{click}$ 318 obtained by performing the softmax operation on the logits 316 of the candidate queries 308 are relative scores among the candidate queries 308. However, the relative scores can be compared against one another for a same prefix, and as such, can be used for ranking the candidate queries 308.

Additionally, or alternatively, a cross-entropy function may be implemented as a loss function during training, as shown in Equation 6 below.

$$\text{loss}(y, P_{click}) = -\sum_{i \in n} y_i \log(p_i) \qquad (6)$$

In the example of FIG. 3, the cross entropy function of Equation 6 is applied to outputs of the softmax layer 306 (e.g., the click probabilities $P_{click}$ 318) to obtain a label 320 for each candidate query 308. A value of a label 320 indicates whether the corresponding candidate query 308 was clicked or not clicked by the user. For instance, a value of 0 may correspond to an unclicked candidate query 308, while a value of 1 may correspond to a clicked candidate query 308. As shown, the candidate query 308-a is associated with a label 320-b having a value of 0, the candidate query 308-b is associated with a label 320-b having a value of 1, and the candidate query 308-c is associated with a label 320-c having a value of 0, indicating that the candidate query 308-b is most likely to be clicked by the user.

In some examples, the ML model is trained using the shallow tower 304 and the positions 314 to reduce the effect of positional bias on the click probabilities calculated for each candidate query 308. The shallow tower 304 and the positions 314 may be excluded from the ML model during inference, e.g., when generating the ranking scores for the candidate queries 308. To prevent the ML model from overfitting to position information and to enable leverage of the feature vectors 312, a 10% dropout rate may be applied.

The ML model may be trained using datasets including behavior data and autocomplete input prefixes for a time period, along with click labels associated with each input prefix's query suggestions. The training datasets may be randomly sampled and structured to ensure there is no temporal overlap or duplication of prefixes within the training datasets. The ML model may be trained for 20 epochs and optimized using AdamW with learning rate $10^{-3}$. To measure performance of the click probability predictions, Log Loss may be used as an evaluation metric. To measure ranking performance, standard area under the curve (AUC) and normalized discounted cumulative gain (NCDG) may be used for the 0-1 click label. For M prefixes in a training dataset, $p^{(m)}$ denotes the model-predicted click probability for a true click suggestion, and $pos^{(m)}$ represents the rank position ($\geq 1$) for the true click suggestion after ranking. The traditional NDCG may be defined as shown in Equation 7 below.

$$NDCG_{click} = \sum_{m=1}^{M} \frac{1}{\log_2\left(pos^{(m)} + 1\right)} \qquad (7)$$

FIG. 4 depicts an example of ranking results 400 in an example implementation of detecting compatibility mismatch by generative artificial intelligence. The ranking results 400 may implement, or be implemented by, aspects of FIG. 1. For example, the ranking results 400 may be implemented by an autocomplete system, such as the autocomplete system 104 as described with reference to FIG. 1. In one or more implementations, the ranking results 400 may be utilized by the autocomplete system to select one or more candidate queries for display to a user (e.g., via a computing device, such as the computing device 102) in an autocomplete list, as described with reference to FIGS. 1 through 3. In some examples, the autocomplete system is associated with an application of an online marketplace, such as the online marketplace 112.

The ranking results 400 include an autocomplete index 402, which includes multiple candidate queries 404. Each candidate query 404 is assigned a global ranking score 406, such as by an autocomplete service (e.g., a third-party autocomplete service, such as Elasticsearch), and a payload 408 (e.g., a data payload). The data payload 408 indicates a set of prefix-dependent ranking scores associated with the candidate query 404. For example, the candidate query 404 "Nintendo" is associated with multiple prefixes including, as illustrated, "ni" and "nin," and each prefix is assigned a ranking score. Thus, each payload 408 includes a set of prefix-dependent ranking scores represented as prefix-ranking score pairs. The prefix-dependent ranking scores are calculated, for each candidate query 404, by a listwise ML model and based on a respective click probability prediction and a respective reward per search as described herein, such as the ML model 134 as described with reference to FIGS. 1-3. Thus, it should be noted that the prefix-dependent ranking scores in the payload 408 are not necessarily the same as the global ranking scores 406, though they may have the same or similar values.

As discussed with reference to FIG. 1, the autocomplete system receives user input of a portion of a search query, such as a prefix 410. Based on the prefix 410, the autocomplete system compiles the autocomplete index 402 by obtaining (e.g., retrieving, receiving) a set of candidate queries 404 according to a prefix match or a conjunctive match with the prefix 410. The autocomplete system obtains the set of candidate queries 404 from a database or other storage for an autocomplete service (e.g., Elasticsearch) and/or an online marketplace. The autocomplete system may then obtain, for each candidate query 404, a respective global ranking score 406 and a respective payload 408 for the respective ranking score described herein.

The global ranking scores 406 may be stored in a database or other storage, such as storage for an autocomplete service and/or an online marketplace. The payload 408 may be similarly stored. For example, the listwise ML model may generate prefix-dependent ranking scores for a relatively large quantity of candidate queries and prefixes (e.g., millions of candidate queries and prefixes) as described with reference to FIGS. 1-3. The autocomplete system stores or otherwise caches the prefix-dependent ranking scores offline, such as in a database or other storage (e.g., the storage device 116 as described with reference to FIG. 1). Accordingly, when the autocomplete system receives the prefix 410, the autocomplete system can obtain corresponding payloads 408 for the candidate queries 404 without running the listwise ML model in real-time. Thus, the techniques described herein enable the autocomplete system to meet latency requirements while providing improved search accuracy and efficiency.

The autocomplete system ranks the candidate queries 404 according to the prefix-dependent ranking scores corresponding to the prefix 410, which may be different from the global ranking scores 406. The autocomplete system orders the candidate queries 404 into an autocomplete list 412 based on the ranking. The autocomplete system may then output the autocomplete list 412 to the user, for example, by displaying the autocomplete list 412 via a user interface of a computing device. The autocomplete list 412 may include a selectable element for each candidate query 404, such that the user can click on or otherwise select a candidate query 404 for searching the online marketplace.

In some examples, the prefix 410 input by the user may not be associated with any prefix-ranking score pairs cached offline. For instance, the prefix 410 may be relatively long (e.g., may have a relatively large number of characters). In such examples, the autocomplete system may utilize the global ranking score 406 to rank the candidate queries 404.

Having discussed exemplary details of listwise autocomplete ranking with position debias, consider now some examples of procedures to illustrate additional aspects of the techniques.

Example Procedures

This section describes examples of procedures for listwise autocomplete ranking with position debias. Aspects of the procedures may be implemented in hardware, firmware, or software, or a combination thereof. The procedures are shown as a set of blocks that specify operations performed by one or more devices and are not necessarily limited to the orders shown for performing the operations by the respective blocks.

FIG. 5 depicts a procedure 500 in an example implementation of listwise autocomplete ranking with position debias.

At 502, user input indicative of a portion of a search query is received. By way of example, an autocomplete system receives user input including a prefix via a user interface of an application (e.g., an autocomplete system 104, a prefix 126, a user interface 114, and an application 110, as described with reference to FIG. 1).

At 504, a set of candidate queries for an autocomplete list is received based on the portion of the search query. By way of example, the autocomplete system receives a set of candidate queries from storage (e.g., candidate queries 120 and storage device 116, as described with reference to FIG. 1). In variations, the set of candidate queries are received based on a prefix match or a conjunctive match of each candidate query with the portion of the search query.

At 506, a respective ranking score for each candidate query of the set of candidate queries is generated by calculating, for each candidate query of the set of candidate queries, a respective click probability prediction and calculating, for each candidate query of the set of candidate queries, a respective reward per search. By way of example, an ML model manager implements a listwise CTR prediction model and ranking logic to calculate click predictions and rewards per search for the set of candidate queries based on click data and transaction data (e.g., an ML model manager 106, an ML model 134, ranking logic 140, click predictions 138, click data 118, and transaction data 122, as described with reference to FIG. 1).

In some examples, to calculate the respective click probability prediction, a set of feature vectors is input to a listwise CTR prediction model, each feature vector corresponding to a candidate query of the set of candidate queries. Each feature vector is compared, jointly, to each other feature vector in the set.

In variations, each feature vector includes at least one attribute of the portion of the search query, at least one statistic associated with the portion of the search query, at least one attribute of the corresponding candidate query, at least one statistic associated with the corresponding search query, or combinations thereof.

In variations, the listwise CTR model is implemented using one or more processing devices. The listwise CTR model has an architecture that includes one or more transformer layers, a shallow tower, and one or more classification layers. The one or more transformer layers are configured to receive training data including a list of text queries (e.g., the set of candidate queries). In some cases, the text queries include one or more feature vectors. In such cases, the one or more feature vectors are indicative of one or more attributes of the text queries, one or more statistics associated with the text queries, or combinations thereof. The shallow tower is configured to model positional bias of the text queries, one to another. The one or more classification layers are configured to receive a result of processing by the one or more transformer layers and the shallow tower to reduce an effect of positional bias as modeled by the shallow tower on the result from the one or more transformer layers.

In some examples, the listwise CTR prediction model is trained using the shallow tower model to reduce an effect of positional bias on the respective click probability prediction calculated for each candidate query of the set of candidate queries.

At 508, the set of candidate queries are ordered according to the respective ranking scores. By way of example, the ML model manager implements the ranking logic to generate an ordered list (e.g., the ML model manager 106, the ranking logic 140, and the ordered list 142, as described with reference to FIG. 1).

At 510, at least one of the candidate queries is output based on the ordered set of candidate queries. By way of example, the autocomplete system displays, via the user interface, an ordered list including the at least one of the candidate queries. In variations, the at least one candidate query includes a subset of candidate queries each having a respective ranking score above a threshold ranking score. In some examples, an indication of the autocomplete list is transmitted including the at least one of the candidate queries to a device for display to a user. In some examples, the autocomplete list includes the at least one of the candidate queries.

FIG. 6 depicts a procedure 600 in an example implementation of listwise autocomplete ranking with position debias.

At 602, user input indicative of a portion of a search query is received. By way of example, an autocomplete system receives user input including a prefix via a user interface of an application (e.g., an autocomplete system 104, a prefix 126, a user interface 114, and an application 110, as described with reference to FIG. 1).

At 604, a set of candidate queries for an autocomplete list is received based on the portion of the search query. By way of example, the autocomplete system receives a set of candidate queries from storage (e.g., candidate queries 120 and storage device 116, as described with reference to FIG. 1). In variations, the set of candidate queries are received based on a prefix match or a conjunctive match of each candidate query with the portion of the search query.

At 606, a ranking score is generated, respectively, for each candidate query of the set of candidate queries by calculating, for each candidate query of the set of candidate queries, a respective click probability prediction by comparing, jointly, each said candidate query to each other said candidate query in the set. By way of example, an ML model manager implements an ML model and ranking logic to calculate click predictions and rewards per search for the set of candidate queries based on click data and transaction data (e.g., an ML model manager 106, an ML model 134, ranking logic 140, click predictions 138, click data 118, and transaction data 122, as described with reference to FIG. 1).

In implementations, a listwise CTR prediction model is used to calculate the respective click probability prediction for each candidate query of the set of candidate queries. In some examples, a respective reward per search is calculated for each candidate query of the set of candidate queries. In such examples, the respective ranking score for each candidate query is based on a product of the corresponding click probability prediction and the corresponding reward per search.

In some cases, a set of feature vectors is input to the listwise CTR model, each feature vector corresponding to a candidate query of the set of candidate queries. In such cases, each feature vector includes at least one attribute of the portion of the search query, at least one statistic associated with the portion of the search query, at least one attribute of the corresponding candidate query, at least one statistic associated with the corresponding search query, or combinations thereof.

In variations, the listwise CTR prediction model is trained using a shallow tower model to reduce an effect of positional bias on the respective click probability prediction calculated for each candidate query of the set of candidate queries. The shallow tower model may be excluded when generating the ranking score.

At 608, the set of candidate queries is ordered according to the respective ranking scores. By way of example, the ML model manager implements the ranking logic to generate an ordered list (e.g., the ML model manager 106, the ranking logic 140, and the ordered list 142, as described with reference to FIG. 1).

At 610, at least one candidate query is output based on the ordered set of candidate queries. By way of example, the autocomplete system displays, via the user interface, an ordered list including the at least one of the candidate queries. In some examples, an indication of the autocomplete list is transmitted including the at least one of the candidate queries to a device for display to a user. In variations, the at least one candidate query includes a subset of candidate queries each having a respective ranking score above a threshold ranking score. In some examples, the autocomplete list includes the at least one of the candidate queries.

Having described examples of procedures in accordance with one or more implementations, consider now an example of a system and device that can be utilized to implement the various techniques described herein.

Example System and Device

FIG. 7 illustrates an example of a system generally at 700 that includes an example of a computing device 702 that is representative of one or more computing systems and/or devices that may implement the various techniques described herein. This is illustrated through inclusion of the application 110 and the autocomplete system 104. The computing device 702 may be, for example, a server of a service provider, a device associated with a client (e.g., a client device), an on-chip system, and/or any other suitable computing device or computing system.

The example computing device 702 as illustrated includes a processing system 704, one or more computer-readable media 706, and one or more I/O interfaces 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware elements 710 that may be configured as processors, functional blocks, and so forth. This may include implementation in hardware as an application specific integrated circuit or other logic device formed using one or more semiconductors. The hardware elements 710 are not limited by the materials from which they are formed, or the processing mechanisms employed therein. For example, processors may be comprised of semiconductor(s) and/or transistors (e.g., electronic integrated circuits (ICs)). In such a context, processor-executable instructions may be electronically executable instructions.

The computer-readable media 706 is illustrated as including memory/storage 712. The memory/storage 712 represents memory/storage capacity associated with one or more computer-readable media. The memory/storage 712 may include volatile media (such as random-access memory (RAM)) and/or nonvolatile media (such as read only memory (ROM), Flash memory, optical disks, magnetic disks, and so forth). The memory/storage 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of a module that is executable by the computing device 702 as software may be achieved at least partially in hardware, e.g., through use of computer-readable storage media and/or hardware elements 710 of the processing system 704. The instructions and/or functions may be executable/operable by one or more articles of manufacture (for example, one or more computing devices 702 and/or processing systems 704) to implement techniques, modules, and examples described herein.

The techniques described herein may be supported by various configurations of the computing device 702 and are not limited to the specific examples of the techniques described herein. This functionality may also be implemented all or in part through use of a distributed system, such as over a "cloud" 714 via a platform 716 as described below.

The cloud 714 includes and/or is representative of a platform 716 for resources 718. The platform 716 abstracts underlying functionality of hardware (e.g., servers) and software resources of the cloud 714. The resources 718 may include applications and/or data that can be utilized while computer processing is executed on servers that are remote from the computing device 702. Resources 718 can also include services provided over the Internet and/or through a subscriber network, such as a cellular or Wi-Fi network.

The platform 716 may abstract resources and functions to connect the computing device 702 with other computing devices. The platform 716 may also serve to abstract scaling of resources to provide a corresponding level of scale to encountered demand for the resources 718 that are implemented via the platform 716. Accordingly, in an interconnected device embodiment, implementation of functionality described herein may be distributed throughout the system 700. For example, the functionality may be implemented in part on the computing device 702 as well as via the platform 716 that abstracts the functionality of the cloud 714.

CONCLUSION

Although the systems and techniques have been described in language specific to structural features and/or methodological acts, it is to be understood that the systems and techniques defined in the appended claims are not necessarily limited to the specific features or acts described. Rather, the specific features and acts are disclosed as example forms of implementing the claimed subject matter.

What is claimed is:

1. A method, comprising:
   receiving a user input indicative of a portion of a search query;
   receiving a set of candidate queries based on the portion of the search query;
   inputting, to a listwise click-through rate (CTR) prediction model that is trained using a shallow tower running parallel to one or more transformer layers to remove positional bias based on position information of respective candidate queries in the set of candidate queries, respective feature vectors corresponding to candidate queries of the set of candidate queries;
   generating, by the listwise CTR prediction model, respective click probability prediction values corresponding to the candidate queries based on joint comparisons between the respective feature vectors;
   generating respective ranking scores for the candidate queries based on a product of the respective click probability prediction values and respective reward per search values associated with the candidate queries; and
   outputting at least one candidate query of the set of candidate queries based on an ordered set of candidate queries, wherein the ordered set of candidate queries is ordered based on the respective ranking scores and independent of the positional bias.

2. The method of claim 1, wherein the respective feature vectors include at least one attribute of the portion of the search query, at least one statistic associated with the portion of the search query, at least one attribute of the candidate queries, at least one statistic associated with the candidate queries or combinations thereof.

3. The method of claim 1, wherein the set of candidate queries are received based on a prefix match or a conjunctive match of each candidate query with the portion of the search query.

4. The method of claim 1, wherein the outputting comprises transmitting an indication of an autocomplete list including the at least one candidate query of the set of candidate queries to a device for display to a user.

5. The method of claim 1, wherein the at least one candidate query includes a subset of candidate queries each having a respective ranking score above a threshold ranking score.

6. The method of claim 1, wherein an autocomplete list includes the at least one candidate query of the set of candidate queries.

7. A method, comprising:
   receiving a user input indicative of a portion of a search query;
   receiving a set of candidate queries based on the portion of the search query;
   inputting, to a listwise click-through rate (CTR) prediction model that is trained using a shallow tower running parallel to one or more transformer layers to remove positional bias based on position information of respective candidate queries in the set of candidate queries, respective feature vectors corresponding to candidate queries of the set of candidate queries;
   generating, by the listwise CTR prediction model, respective click probability prediction values corresponding to the candidate queries based on joint comparisons between the respective feature vectors, wherein the shallow tower is excluded from the listwise CTR prediction model to generate the respective click probability prediction values;
   generating respective ranking scores for the candidate queries based on a product of the respective click probability prediction values and respective reward per search values associated with the candidate queries; and
   outputting at least one candidate query of the set of candidate queries based on an ordered set of candidate queries, wherein the ordered set of candidate queries is ordered based on the respective ranking scores and independent of the positional bias.

8. The method of claim 7, wherein the respective feature vectors include at least one attribute of the portion of the search query, at least one statistic associated with the portion of the search query, at least one attribute of the candidate queries, at least one statistic associated with the candidate queries or combinations thereof.

9. The method of claim 7, wherein the set of candidate queries are received based on a prefix match or a conjunctive match of each candidate query with the portion of the search query.

10. The method of claim 7, wherein the outputting comprises transmitting an indication of an autocomplete list including the at least one candidate query of the set of candidate queries to a device for display to a user.

11. The method of claim 7, wherein the at least one candidate query includes a subset of candidate queries each having a respective ranking score above a threshold ranking score.

12. The method of claim 7, wherein an autocomplete list includes the at least one candidate query of the set of candidate queries.

13. The method of claim 1, wherein the listwise CTR prediction model includes the one or more transformer layers and one or more classification layers, and wherein the listwise CTR prediction model includes the shallow tower during training.

14. The method of claim 13, further comprising:

generating, by the listwise CTR prediction model and during the training of the listwise CTR prediction model, respective logits associated with a plurality of training candidate queries for training the listwise CTR prediction model, wherein the respective logits are based on a summation of a first output of the one or more transformer layers and a second output of the shallow tower;

providing the respective logits as input to the one or more classification layers to obtain training click probability prediction values associated with the plurality of training candidate queries; and updating one or more parameters of the listwise CTR prediction model based on a loss calculated from the training click probability prediction values.

15. The method of claim 14, wherein the loss is based on a loss function that compares predicted probability distributions over the plurality of training candidate queries to ground truth labels derived from historical user interaction data, wherein the ground truth labels indicate whether respective training candidate queries of the plurality of training candidate queries are clicked.

16. The method of claim 13, wherein generating the respective click probability prediction values comprises:

processing the respective feature vectors through the one or more transformer layers to generate transformer output values; and providing the transformer output values to the one or more classification layers to generate the respective click probability prediction values, wherein the shallow tower is excluded from the listwise CTR prediction model to generate the respective click probability prediction values.

17. The method of claim 7, wherein the listwise CTR prediction model includes the one or more transformer layers and one or more classification layers, and wherein the listwise CTR prediction model includes the shallow tower during training.

18. The method of claim 17, further comprising:

generating, by the listwise CTR prediction model and during the training of the listwise CTR prediction model, respective logits associated with a plurality of training candidate queries for training the listwise CTR prediction model, wherein the respective logits are based on a summation of a first output of the one or more transformer layers and a second output of the shallow tower;

providing the respective logits as input to the one or more classification layers to obtain training click probability prediction values associated with the plurality of training candidate queries; and updating one or more parameters of the listwise CTR prediction model based on a loss calculated from the training click probability prediction values.

19. The method of claim 18, wherein the loss is based on a loss function that compares predicted probability distributions over the plurality of training candidate queries to ground truth labels derived from historical user interaction data, wherein the ground truth labels indicate whether respective training candidate queries of the plurality of training candidate queries are clicked.

20. The method of claim 17, wherein generating the respective click probability prediction values comprises:

processing the respective feature vectors through the one or more transformer layers to generate transformer output values; and providing the transformer output values to the one or more classification layers to generate the respective click probability prediction values.

*     *     *     *     *